United States Patent [19]

Etter et al.

[11] 4,023,051

[45] May 10, 1977

[54] RECTIFIER SWITCH WITH SERIES-CONNECTED THYRISTORS

[75] Inventors: Peter Etter, Oberehrendingen; Werner Faust, Wettingen, both of Switzerland

[73] Assignee: BBC Brown Boveri & Company Limited, Baden, Switzerland

[22] Filed: Oct. 6, 1975

[21] Appl. No.: 619,980

[30] Foreign Application Priority Data

Oct. 28, 1974 Switzerland ............... 14397/74

[52] U.S. Cl. ............... 307/305; 307/252 L; 307/252 Q; 357/39

[51] Int. Cl.² ............... H03K 3/35

[58] Field of Search ............... 321/11, 27 R; 307/252 H, 252 L, 252 Q, 302, 305; 357/391

[56] References Cited

UNITED STATES PATENTS

| | | |
|---|---|---|
| 3,559,037 | 1/1971 | Faust ............... 321/27 |
| 3,579,082 | 5/1971 | Bossi et al. ............... 307/252 L |
| 3,943,427 | 3/1976 | Tolstov et al. ............... 321/11 |
| 3,947,726 | 3/1976 | DeCecco ............... 321/11 |

FOREIGN PATENTS OR APPLICATIONS 269,283   7/1970   U.S.S.R. ............... 307/252 L

OTHER PUBLICATIONS

Brown Boverie Rev. 2/3, vol. 60, pp. 100–107, Feb.–Mar. 1973.

*Primary Examiner*—William H. Beha, Jr.
*Attorney, Agent, or Firm*—Oblon, Fisher, Spivak, McClelland & Maier

[57] ABSTRACT

A rectifier switch has a plurality of series-connected thyristors, the forward and reverse blocking voltages of which exhibit a large spread of at least 10%. A plurality of voltage limiting elements are disposed to shunt the plurality of series-connected thyristors to match the distribution of maximum voltages occurring during operation of the plurality of series-connected thyristors to obtain full utilization of the blocking capability of the thyristors.

2 Claims, 7 Drawing Figures

RECTIFIER SWITCH WITH SERIES-CONNECTED THYRISTORS

BACKGROUND OF THE INVENTION

1. Field of the Invention

The invention concerns a rectifier switch with series-connected thyristors, which exhibit a considerable spread of at least 10% in their forward and reverse blocking voltages, especially for high-voltage, high-power rectifiers.

2. Description of the Prior Art

The forward and reverse blocking voltages of the thyristors of one or more production batches, made by the production techniques customary today, exhibit a large spread of about 30% - 40%. FIG. 1 shows diagrammatically the spread of the forward and reverse blocking voltages of the thyristors of a lot. ST is the number of thyristors classified as to voltage and laid out along the ordinate axis, the abscissa indicates the voltage and the forward blocking voltage $U_B$ is in the positive direction while the breakdown voltage $U_D$ is in the negative direction. The vertical lines $S_{PN}$ bound the voltage classes e.g. for low-voltage applications. FIG. 1a shows the current-voltage characteristic of a thyristor.

In view of the great voltage spread of thyristors, it is customary in low-voltage technology to use only thyristors of one voltage class for a rectifier, as FIG. 1 shows. In high-voltage-direct-current transmission systems, among others, thyristors of high breakdown strength are used to an increasing extent. The classification of such thyristors at present establishes the rated voltage of the thyristors of the production run according to the thyristor with the lowest breakdown strength; thus a large proportion of the thyristors is poorly utilized in terms of voltage. FIG. 2 shows the relevant conditions for the spread in the forward and reverse blocking voltages of the thyristors of lot, e.g. for high-voltage-direct-current transmission (HVDC). NSPG is the rated voltage of the thyristors.

Based on the above statements, there is a need to use as many as possible of the serviceable thyristors of a batch for the high-power switches of an installation and to utilize all thyristors fully, voltagewise. This has its problems, however, because with full voltage loading of the thyristor chain there occurs an unequal voltage distribution across the individual thyristors - due to their individual and their dynamic characteristics as well as to external influences (ground capacities, component tolerances).

SUMMARY OF THE INVENTION

The invention aims at overcoming these difficulties.

The foregoing and other objects are attained in accordance with one aspect of the present invention in a rectifier switch of the above-mentioned type with series thyristors, which exhibit a considerable spread in their forward and reverse blocking voltages, by adjusting the voltages with voltage-limiting elements connected across the thyristors, to enable full utilization, voltagewise, of the individual thyristors and therefore also the thyristor chain.

The voltage-limiting elements can be in the form of back-to-back semiconductor diodes with uniform avalanche breakdown (CAD-elements) which are connected across each thyristor and which sharply limit the voltage in either direction exceeding their diode-breakdown voltage, with this breakdown voltage being matched in each case to the triggering or breakdown voltage of the shunted thyristor.

BRIEF DESCRIPTION OF THE DRAWINGS

Various objects, features and attendant advantages of the present invention will be more fully appreciated as the same becomes better understood from the following detailed description when considered in connection with the accompanying drawings, in which.

DETAILED DESCRIPTION OF A PREFERRED EMBODIMENT

Figure 1:
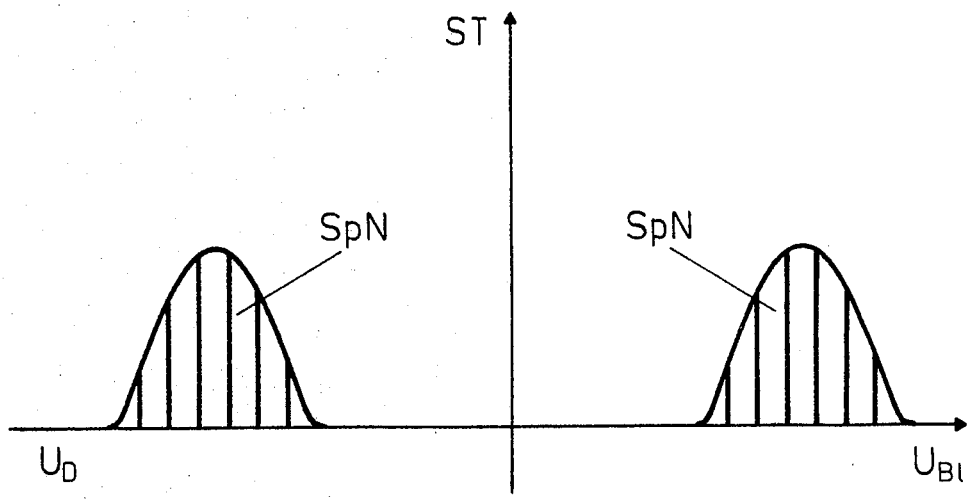
FIG. 1 shows diagrammatically the spread of the forward and reverse blocking voltages of the thyristors of a lot.
Figure 1A:
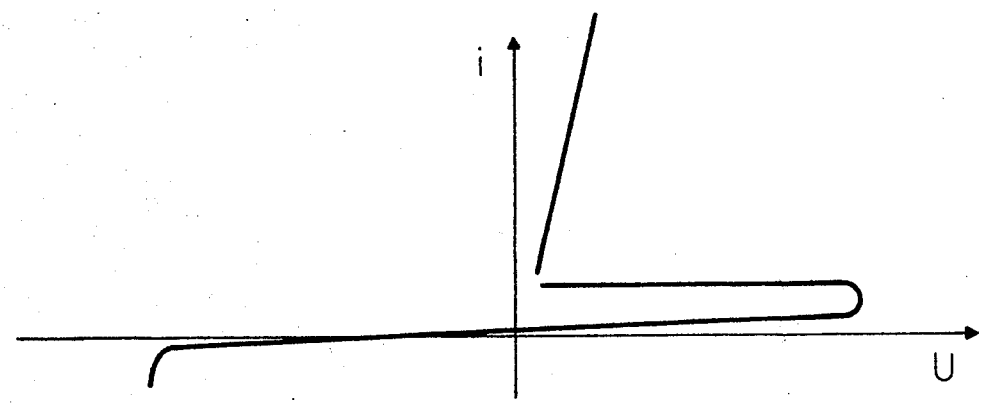
FIG. 1a shows the current-voltage characteristic of a thyristor.
Figure 2:
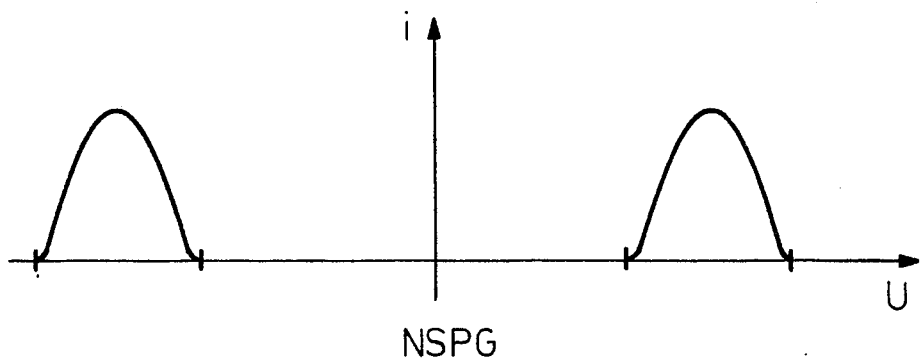
FIG. 2 shows the relevant conditions for the spread in the forward and reverse blocking voltages of the thyristors of a lot.
Figure 3A:
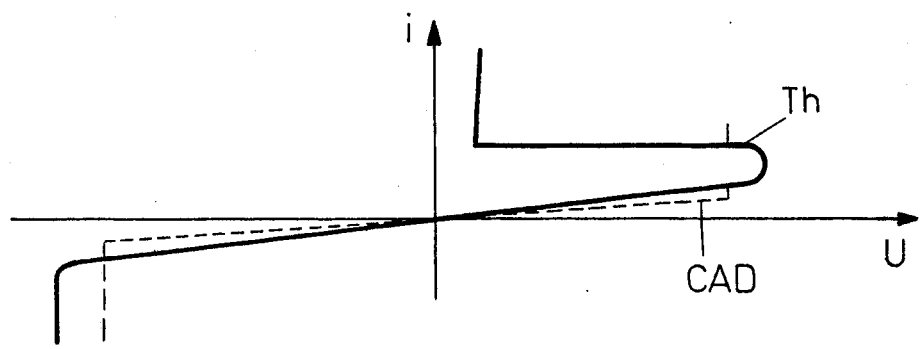
FIG. 3a shows the V/I characteristics of a low breakdown strength thyristor shunted by a CAD-element matched in voltage.
Figure 3B:
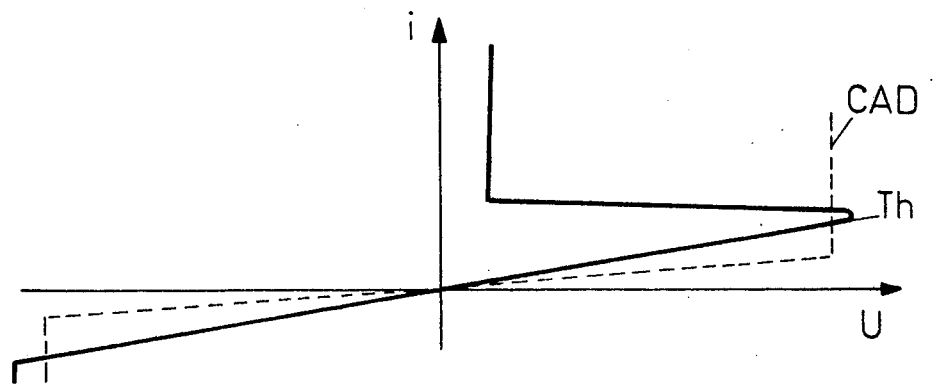
FIG. 3b shows the V/I characteristics of a high breakdown strength thyristor shunted by a CAD-element matched in voltage.

Referring now to the drawings, wherein like reference numerals designate identical or corresponding parts throughout the several views, and more particularly to FIGS. 3a and 3b thereof, FIGS. 3a and b show the V/I characteristics of a thyristor shunted by a CAD-element matched in voltage, FIG. 3a is for a low breakdown strength thyristor, FIG. 3b for one with high breakdown strength. The solid line characteristic Th in each case is the thyristor's while the dashed one CAD is the CAD-element's.

Figure 4:
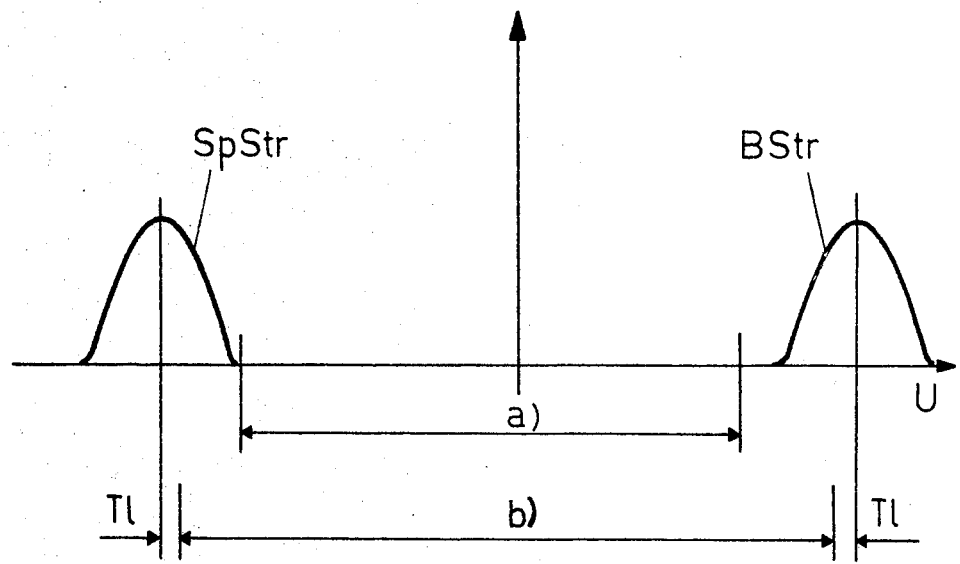
FIG. 4 shows the voltage utilization improvement for a batch of thyristors in accordance with the invention.

As appears from FIG. 4, a batch of thyristors, of which CAD-elements are connected in parallel, is utilized voltagewise about 10 to 15% better, resulting in notable economic advantages. The ordinate shows the thyristor quantities, the abscissa gives the voltages. The designation (a) indicates the voltage utilization of the thyristors by the customary use up to the rated voltage of the batch, the designation (b) indicating the average voltage utilization of the thyristors of a batch by use up to almost the forward blocking voltage or breakdown voltage. The two spreads, BStr in the forward and SpStr in the reverse blocking direction, are simply represented as Gaussian bell-shaped curves with a distinct distribution maximum. The points where the bell-shaped curves cross the U-axis give the values of the forward and reverse blocking voltages, T1 being the tolerance allowing the imperfect voltage matching of thyristors and CAD-elements.

Figure 5:
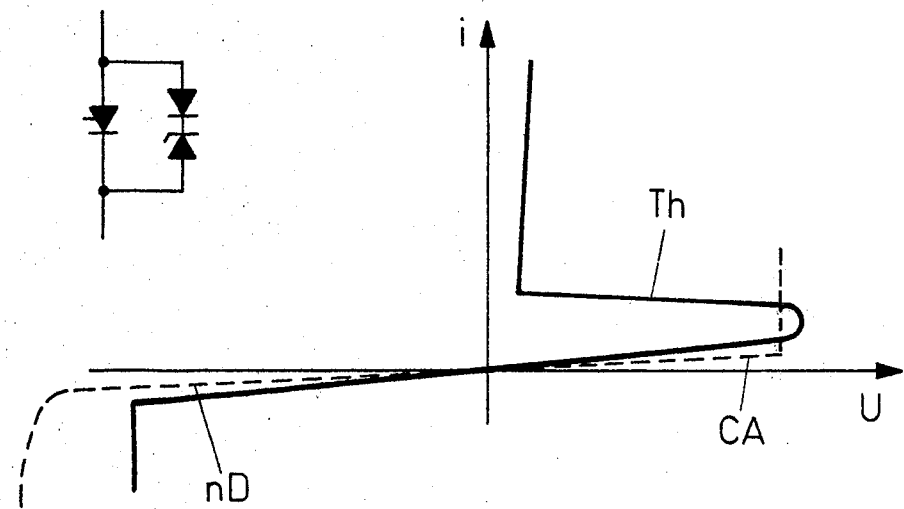
FIG. 5 shows a thyristor which exhibits a uniform avalanche breakdown in the blocking direction which can itself act as a voltage-limiting element for the reverse blocking direction.

If the thyristor itself exhibits a uniform avalanche breakdown in the blocking direction (controlled avalanche behavior), the thyristor can itself act as the voltage-limiting element for the reverse blocking direction. Such a thyristor is represented in FIG. 5. If a voltage-limiting element is desirable for the forward blocking direction of the thyristor also, it is sufficient to arrange the back-to-back connected diodes so that the diode for the forward blocking direction exhibits a uniform avalanche breakdown, while in order not to short circuit the thyristor in the reverse blocking direction, an ordinary diode of lower current capacity but higher voltage breakdown than the thyristor is used.

The current-voltage characteristic of this variant is likewise given in FIG. 5, Th is the thyristor characteristic, CA is the characteristic of the matched diode with uniform avalanche breakdown and nD is the characteristic of the normal diode.

Obviously, numerous modifications and variations of the present invention are possible in light of the above teachings. It is therefore to be understood that within the scope of the appended claims the invention may be practiced otherwise than as specifically described herein.

What is claimd as new and desired to be secured by Letters Patent of the United States is:

1. A method of improving the use efficiency of a batch of high voltage thyristors by enabling use of said thyristors near their individual maximum voltage ratings, comprising the steps of:

preparing a batch of high voltage thyristors having forward and reverse blocking voltages which exhibit a spread of at least 10%.

matching said forward and reverse blocking voltages of each said thyristor with a controlled avalanche device having substantially the same forward and reverse blocking voltages, connecting said voltage matching controlled avalanche devices in parallel with said thyristors for forming voltage matched thyristors; and, coupling said voltage matched thyristors in series for utilization at voltage levels near their individual maximum rated breakdown and blocking voltages.

2. A method as in claim 1, wherein said step of connecting includes the step of:

coupling back-to-back connected semiconductor diodes with uniform avalanche breakdown in parallel across each said thyristor.

* * * * *